H. C. WELL.
INTERNAL COMBUSTION ENGINE.
APPLICATION FILED AUG. 17, 1914.
1,163,492.
Patented Dec. 7, 1915.
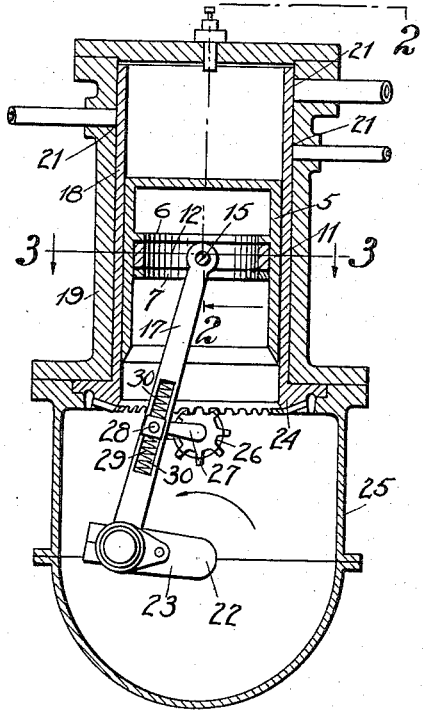
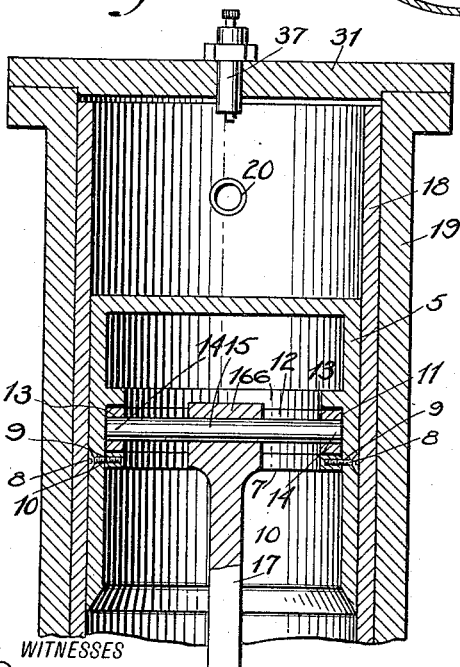
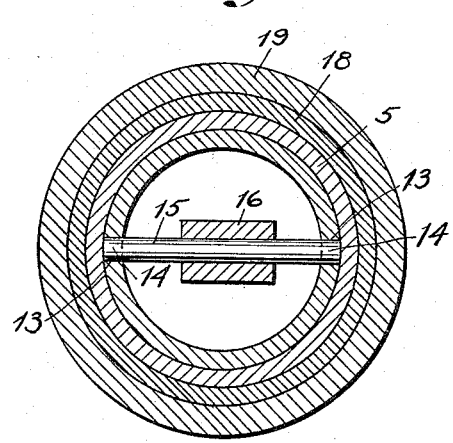
WITNESSES
INVENTOR
Hugo C. Well
BY
ATTORNEYS

250;
UNITED STATES PATENT OFFICE.

HUGO C. WELL, OF NEW YORK, N. Y., ASSIGNOR OF FIFTY ONE-HUNDREDTHS TO FREDERICK A. B. MEINHARDT, OF NEW YORK, N. Y.

INTERNAL-COMBUSTION ENGINE.

1,163,492. Specification of Letters Patent. Patented Dec. 7, 1915.

Application filed August 17, 1914. Serial No. 857,096.

*To all whom it may concern:*

Be it known that I, HUGO C. WELL, a subject of the Emperor of Germany, a resident of the city of New York, borough of the Bronx, in the county of Bronx and State of New York, have invented a new and Improved Internal-Combustion Engine, of which the following is a full, clear, and exact description.

My invention has for its object to provide an internal combustion engine with means to reduce the friction between a rotary valve sleeve and a reciprocating piston.

In carrying out my invention I provide a ring to which the piston rod is articulated, this ring being rotatably disposed in an annular guideway at the inner side of the hollow piston.

Additional objects of the invention will appear in the following specification in which the preferred form of my invention is disclosed.

In the drawings similar reference characters refer to similar parts in all the views in which—

Figure 1 is a sectional elevation showing the internal combustion engine provided with my improvement; Fig. 2 is an enlarged sectional view on the line 2—2 of Fig. 1; and Fig. 3 is a sectional view on the line 3—3 of Fig. 1.

By referring to the drawings it will be seen that a hollow reciprocating piston 5 is provided, this piston having an inwardly disposed flange 6 and a second annular flange 7 which is spaced from the flange 6 and which is held in a predetermined position by the screws 8 which are disposed in threaded orifices 9 in the piston 5 and which mesh in threaded openings 10 in the flange 7. Disposed in the guideway 11 formed by the wall of the piston 5 and the flanges 6 and 7 there is a ring 12, the said ring 12 being free to rotate in the said guideway. This ring 12 has bearings 13 in which are journaled the terminals 14 of the stud 15 to which the upper end 16 of the piston rod 17 is articulated. The piston 5 is disposed within a valve sleeve 18 which in turn is disposed within a cylinder 19. The valve sleeve 18 is provided with ports 20 and is rotated by means which will shortly be described for bringing the said ports 20 into communication with ports 21 in the cylinder for supplying the cylinder with a combustible mixture and for scavenging the cylinder after the combustible mixture has been ignited. In view of the fact that the piston 5 may rotate with the valve sleeve 18, undesirable friction between the said piston and the valve sleeve is eliminated, while the piston 5 is permitted to reciprocate in the customary manner and rotate the shaft 22 by means of the ring 12, the stud 15 the piston rod 17 and the crank 23.

As a means for rotating the valve sleeve 18 I propose to provide the valve sleeve 18 with gearing 24 at its lower end and adjacent the crank shaft 25, a gear 26 meshing with the said gear 24 and being provided with a crank 27 having an arm 28 which is disposed in a slot 29 in the piston rod 17, the arm 28 of the crank 27 being held yieldingly in position relatively to the piston rod 17 by means of the springs 30. It will, therefore, be seen that with the normal movement of the piston rod 17, the crank 27 will be rotated to rotate the valve by means of the gear 26 which meshes with the gear 24 at the bottom of the valve sleeve.

The cylinder 19 is provided with a head 31 having the customary spark plug 37.

Having thus described my invention I claim as new and desire to secure by Letters Patent:

1. In an internal combustion engine, a cylinder, a piston for reciprocating in the cylinder and having an annular guideway disposed coaxially with the cylinder and piston, a member rotatably disposed in the guideway, a piston rod articulated to the member and means by which the piston rod is adapted to rotate a shaft.

2. In an internal combustion engine, a cylinder having a piston for reciprocating in the cylinder and having an annular guideway, disposed coaxially with the cylinder and piston, a ring rotatably disposed in the guideway, a piston rod articulated to the ring and means by which the piston rod is adapted to rotate a shaft.

3. In an internal combustion engine, a cylinder, a piston for reciprocating in the cylinder and having an annular guideway disposed coaxially with the cylinder and piston, a ring rotatably disposed in the guideway, the ring being provided with bearings, a stud journaled in the bearings, a piston rod mounted on the stud, and means by which the piston is adapted to rotate a shaft.

4. In an internal combustion engine, a cylinder, a rotary valve sleeve rotatably mounted in the cylinder, a piston for reciprocating in the valve sleeve and having an annular guideway disposed coaxially with the cylinder and piston, a member movably disposed in the guideway, a piston rod articulated to the member, and means by which the piston rod is adapted to rotate a shaft and the sleeve.

5. In an internal combustion engine, a cylinder, a valve sleeve rotatably disposed in the cylinder, a piston for reciprocating in the cylinder and having an annular guideway disposed coaxially with the cylinder and the piston, a ring rotatably disposed in the guideway, the ring being provided with bearings, a stud journaled in the bearings, a piston rod mounted on the stud and means by which the piston is adapted to rotate a shaft and the valve sleeve.

In testimony whereof I have signed my name to this specification in the presence of the two subscribing witnesses.

HUGO C. WELL.

Witnesses:
 EVERARD B. MARSHALL,
 PHILIP D. ROLLHAUS.

Copies of this patent may be obtained for five cents each, by addressing the "Commissioner of Patents, Washington, D. C."